United States Patent [19]

Renninger

[11] Patent Number: 4,626,987
[45] Date of Patent: Dec. 2, 1986

[54] METHOD OF AND CIRCUIT ARRANGEMENT FOR SUPPLYING INTERRUPT REQUEST SIGNALS

[75] Inventor: Siegfried Renninger, Nuremberg, Fed. Rep. of Germany

[73] Assignee: U.S. Philips Corporation, New York, N.Y.

[21] Appl. No.: 527,619

[22] Filed: Aug. 29, 1983

[30] Foreign Application Priority Data

Sep. 10, 1982 [DE] Fed. Rep. of Germany ....... 3233542

[51] Int. Cl.$^4$ .............................................. G06F 1/00
[52] U.S. Cl. .................................................... 364/200
[58] Field of Search ... 364/200 MS File, 900 MS File; 340/825.5

[56] References Cited

U.S. PATENT DOCUMENTS

| 4,090,238 | 5/1978 | Russo | 364/200 |
| 4,099,255 | 7/1978 | Stanley et al. | 364/200 |
| 4,271,464 | 6/1981 | MacMillan | 364/200 |
| 4,375,639 | 3/1983 | Johnson, Jr. | 364/200 |

Primary Examiner—James D. Thomas
Assistant Examiner—William G. Niessen
Attorney, Agent, or Firm—Jack E. Haken; James J. Cannon, Jr.

[57] ABSTRACT

A circuit arrangement for supplying interrupt requests signals from a peripheral unit to a central processing unit of a computer system over a common control line, without a priority scheme. A blocking circuit is provided such that the first interrupt signal on the common control line blocks any further interrupt signals on that line until the interrupt has been processed. Since no further interrupts are possible, the interrupt acknowledged signal from the central processing unit need not contain the address of the external unit having requested the interrupt nor need there be provided a circuit to process the interrupt acknowledge signal in the peripheral unit. An interrupt signal present on the common interrupt line blocks generation of subsequent interrupt signals from reaching the common interrupt line by a combination of the two interrupting switches together with a delay after the first switch. The station generating the first interrupt signal contains the means for blocking the reception of subsequent signals. The circuit is useful for systems which include relatively slow peripheral devices.

7 Claims, 2 Drawing Figures

METHOD OF AND CIRCUIT ARRANGEMENT FOR SUPPLYING INTERRUPT REQUEST SIGNALS

BACKGROUND OF THE INVENTION

1. Field of the Invention

The invention relates to a method for external units of a computer for supplying interrupt request signals without priorities to the central processor unit of the computer via a common control line.

2. Description of the Prior Art

Adam Osborne, Einführung in die Mikrocomputertecknik, 1977, describes on pages 5-10 to 5-24 how interrupts are initiated in computer systems.

External units or peripheral apparatus in most computer systems are capable of interrupting the program steps currently being executed in the central processor unit (CPU) of the computer by means of an interrupt request signal. The external units are connected to the central processor unit of the computer via a common control line on which they despatch their interrupt request signals.

The central processor unit acknowledges each individual interrupt request by way of an interrupt acknowledge. For as long as interrupts are not requested simultaneously by more than one external unit, the interruptions are executed consecutively. However, when two or more external units despatch coexistent interrupt request signals on the common control line, the execution of the individual interrupts must somehow be controlled.

Two solutions are known to this problem. One solution consists in that interrupt priorities are assigned to the external units. When the central processor unit simultaneously receives interrupt request signals from several external units, the interrupts are executed in accordance with the priorities assigned to the external units. Thus, external units having requested an interrupt receive the interrupt acknowledgements from the central processor unit in the same order of priorities.

Another known solution in the relevant field is a method without priorities. All external units have the same priority as regards the requesting of interrupts. As in the first solution, the external units are connected to the central processor unit of the computer by means of a common control line on which the interrupt request signals are despatched. From the central processor unit there is only a single line on which the central processor unit returns the interrupt acknowledge and which extends to only one of the external units wherefrom a further line extends to the next unit and so on until the last unit wherefrom no further line extends, so that all units which are capable of requesting an interrupt are directly linked. This is referred to as daisy chaining. The interrupt acknowledge despatched by the central processor unit contains the address of the unit having despatched the interrupt request signal. When the first unit receives the interrupt acknowledge, a logic circuit checks whether the acknowledge contains its own address. If this is not the case, the first unit passes the interrupt acknowledge onto the next unit whose logic circuit then checks whether the interrupt acknowledge contains its own address. If this is so, the interrupt acknowledge will not be passed on to the next unit. Except for the last unit wherefrom no further line extends, therefore, all units should comprise a logic circuit which is capable of detecting whether the interrupt acknowledge contains its own address, and which, if this is not the case, passes the interrupt acknowledge on to the next unit but which does not pass on the interrupt acknowledge to the next unit when it recognizes its own address.

Because the interrupt acknowledge is tested in each unit and may have to be passed on from unit to unit in accordance with the test results, this is a complex method. It is also expensive because each unit with the exception of the last one, requires a logic circuit for address recognition.

SUMMARY OF THE INVENTION

Therefore, it is an object of the invention to provide a simple and inexpensive method for supplying interrupt request signals. This object is achieved in that an interrupt signal despatched on the control line by an external unit blocks the despatch of any interrupt request signal from the other external units.

Because in the method in accordance with the invention an interrupt request signal on the control line blocks the supply of further interrupt request signals by all external units, except for the unit having despatched the interrupt request signal to the central processor unit of the computer, the interrupt acknowledge from the central processor unit need not contain the address of the external unit having requested the interrupt. Consequently, the processing of the interrupt acknowledge in the individual external units can also be dispensed with so that these units can be manufactured to be simpler and cheaper because they no longer comprise a logic circuit for address recognition.

Figure 1:
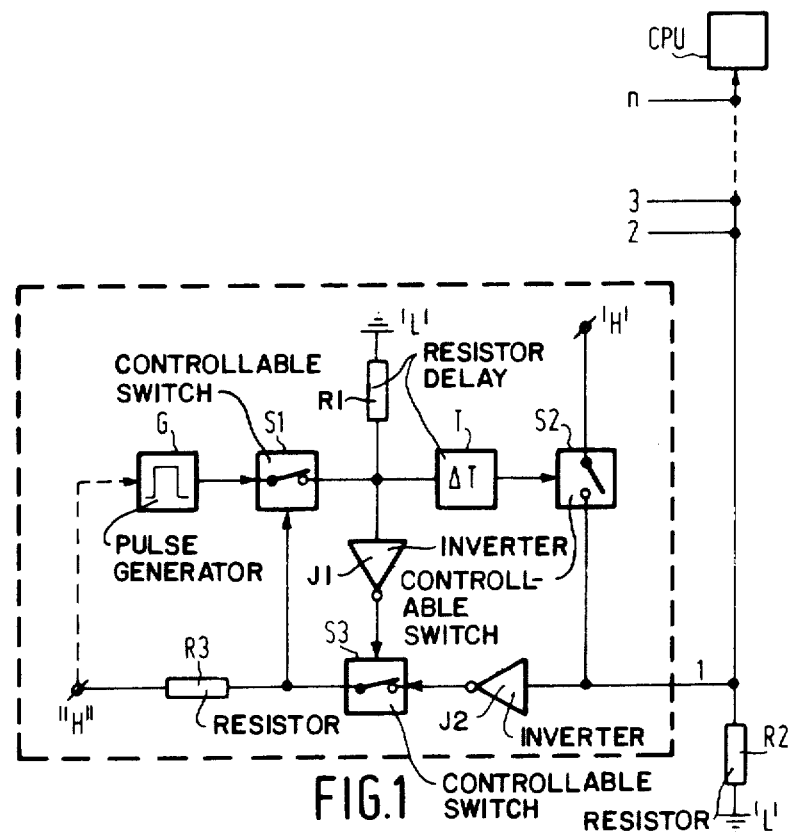
FIG. 1 shows a circuit for performing the method of the invention.

A circuit arrangement for performing the method in accordance with the invention will be described in detail hereinafter with reference to FIG. 1.

DESCRIPTION OF THE PREFERRED EMBODIMENT

In order to perform the method in accordance with the invention the outputs of several circuit arrangements 1 . . . n are connected to the central processor unit CPU of a computer via a control line SL. For the sake of clarity, FIG. 1 shows only the circuit arrangement 1; the other circuit arrangements are denoted by the symbols 2 . . . n. All parallel connected outputs of the individual circuit arrangements are connected to a level L (L=LOW) via a resistor R2.

The output of a pulse generator G which outputs a level H (H=HIGH) as an interrupt request signal until the interrupt request has been dealt with is connected to the input of a controllable switch S1 whose output is connected to the input of a delay member T and to the input of an inverter J1 and carries the level L via a resistor R1. The output of the delay member T is connected to the control input of a controllable switch S2 whose input carries the level while its output is connected to the control line SL and to the input of an inverter J2. This junction constitutes the output of the circuit arrangement. The output of the inverter J2 is connected to the input of a controllable switch S3 whose output is directly connected to the control input of the controllable switch S1 and carries the level H via a resistor R3. The output of the inverter J1 is connected to the control input of the controllable switch S3.

The terms input and output are to be understood to refer to the signal flow for the switches.

The function of the circuit arrangement shown in FIG. 1 will be described in detail hereinafter.

The controllable switches S1, S2 and S3 are open when their control inputs carry the level L; however, they are closed when their control inputs carry the level, H.

It will first be assumed that none of the circuit arrangements 1 ... n despatches an interrupt request signal in the form of a level H pulse on the control line SL, so that the latter assumes the level L via the resistor R2. Consequently, the following explanations hold good for all circuit arrangements 1 ... n.

Because the pulse generator G does not output the level H, the input and the output of the switch S1 carry the level L, so that the control input of the switch S2 also carries the level L; however, because of the inverter J1 the control input of the switch S3 carries the level H. Consequently, the switch S2 is open while the switch S3 remains closed. The switch S1 also remains closed, because its control input carries the level H because it is connected via the closed switch S3 and the inverter J2, to the control line SL which carries the level L because of the resistor R2. FIG. 1 shows the described switch positions.

Let us assume that a circuit arrangement requests an interrupt. In this circuit arrangement, the pulse generator G transmits the level H which reaches the control input of the switch S3, via the closed switch S1, without delay but in inverted form because of the inverter J1; however, because of the delay member T it reaches the control input of the switch S2 with a delay. Consequently, first the switch S3 is opened without delay while the switch S2 is closed after a delay. Because the switch S2 is now closed, the control line SL carries the level H which is interpreted as an interrupt request signal by the central processor unit. Because the switch S3 opens before the switch S2 closes, the level H cannot be fed back to the control input of the switch S1. Consequently, the switch S1 remains closed.

The steps described hereinafter take place in the same way in the remaining external units which have not requested an interrupt.

Because the control line SL, now carrying the level H, is connected to the control input of the switch S1 via the inverter J2 and the closed switch S3, this control input assumes the level L, so that the switch S1 is opened. As soon as the switch S1 is opened, the output of an interrupt request signal is suppressed because the level H on the output of the pulse generator G no longer reaches the control inputs of the switches S2 and S3.

Consequently, the interrupt request signal on the control line blocks the output of an interrupt request signal by all external units except for the unit having requested the interrupt. Thus, evaluation of an address contained in the interrupt acknowledge in the individual external units as well as the daisy chaining thereof can be dispensed with in a circuit arrangement in accordance with the invention.

Figure 2:
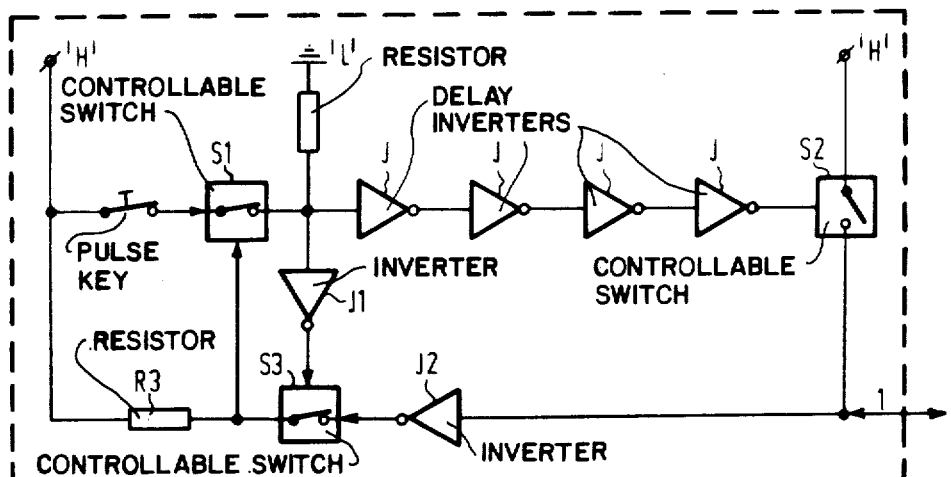
FIG. 2 shows a circuit for performing the method of the invention in which the delay element is made up from four inverters.

FIG. 2 shows a circuit arrangement in which the delay member is formed by four consecutively connected inverters J. For the sake of simplicity, only the single external unit "1" is shown.

The pulse generator G is formed by a key TA whose input carries the level H and whose output is connected to the input of the switch S1.

In the switch positions shown in FIG. 2, the circuit arrangement supplies an interrupt request signal.

The desribed circuit arrangements may also comprise controllable switches which are open when their control inputs carry the level H and which are closed when their control inputs carry the level L, in as far as L and H are interchanged. An interrupt request signal would then have the level L.

In FIG. 2, for example, the switches S1, S2, S3 are CMOS switches of the type MC14066B and the inverters are of the type MC14049UB. A supply voltage of 10 volts is applied to both units.

A typical value for the despatch delay of an interrupt request signal is 140 ns and 250 ns is a maximum value. For the reception delay of an interrupt request signal (via the elements J2, S3, S1) a typical value is 60 ns and a maximum value is 120 ns. The execution of the interrupt (acknowledge, data transmission, data processing) of course, may take much longer. Two successive interrupt request signals, therefore, should be spaced at least approximately 400 ns apart in this example. Using an input by means of keys, of course, this in ensured. This is also the case for many other systems.

The inverter J1 can be dispensed with when the switch S3 exhibits an opposite switching behavior with respect to the switches S1 and S2: the switch S3 is closed in the case of the level H on its control input, while the switches S1 and S2 are open in the case of the level H on the control input. Similarly, the switch S3 may be closed when its control input carries the level L while the switches S1 and S2 are open when their control inputs carry the level L.

In many cases, however, the embodiments comprising the inverter J1 is to be preferred, because switches exhibiting the same switching behavior, for example, so-called analog switches can then be used.

The circuit arrangement can be modified in various ways. For example, the switch S3 may be omitted when the output signal of the switch S1 sets a monostable element which is followed by the delay member T. Considering the described delay times, the astable period of the monostable element may amount to some microseconds.

What is claimed is:

1. A peripheral apparatus for a computer system, which apparatus has an output for an interrupt request signal and comprises an interrupt request pulse generator, a delay element, to an input of which the output of the generator is coupled, and an output of which is coupled to the said output for an interrupt request signal, sensing means for sensing the presence of an interrupt request pulse at the generator output, blocking means for blocking the operation of the sensing means and the transmission of an interrupt request pulse from the generator output to the delay element input if an interrupt request signal should be present on the said output for an interrupt request signal, and inhibiting means for inhibiting the blocking action of the blocking means in response to the sensing by said sensing means of the presence of an interrupt request pulse at the generator output.

2. Apparatus as claimed in claim 1, wherein a said interrupt request pulse at the generator output has a first potential level, wherein the blocking, sensing and inhibiting means comprise a first controllable switch, a second controllable switch and an inverter respectively, the first switch coupling the generator output to the delay element input and to a control input of the second switch and having its output also connected via a first resistor to a point carrying a second potential level, the second controllable switch coupling the output of the inverter to a control input of the first switch and having its output also connected via a second resistor to a point carrying the first potential level, and the inverter having its input connected to the said output for an interrupt request signal, and wherein the coupling from the delay element output to the said output for an interrupt request signal comprises a coupling from the delay element output to a control input of a third controllable switch which couples a point carrying said first potential level to said output for an interrupt request signal.

3. Apparatus as claimed in claim 2, wherein the coupling from the first switch to the control input of the second switch includes a second inverter.

4. Apparatus as claimed in claim 3, wherein the controllable switches are open when their control inputs carry the second potential level and are closed when their control inputs carry the first potential level.

5. Apparatus as claimed in claim 2, wherein the second switch is closed when its control input carries the second potential level and is open when its control input carries the first potential level, the first and third controllable switches being closed when their control inputs carry the first potential level and being open when their control inputs carry the second potential level.

6. Apparatus as claimed in any one of claims 1 to 5, wherein the delay element consists of an even number of inverters connected in cascade.

7. Apparatus as claimed in any one of claims 2 to 5, wherein the interrupt request signal generator is formed by a key-operated switch connected between a point carrying the first potential level and the first switch.

* * * * *